United States Patent [19]
Cortes et al.

[11] Patent Number: 5,640,492
[45] Date of Patent: Jun. 17, 1997

[54] SOFT MARGIN CLASSIFIER

[75] Inventors: Corinna Cortes, New York, N.Y.; Vladimir Vapnik, Middletown, N.J.

[73] Assignee: Lucent Technologies Inc., Murray Hill, N.J.

[21] Appl. No.: 268,361

[22] Filed: Jun. 30, 1994

[51] Int. Cl.$^6$ .................. G06E 1/00; G06E 3/00
[52] U.S. Cl. ............................................... 395/23
[58] Field of Search ..................................... 395/23

[56] References Cited

U.S. PATENT DOCUMENTS

| | | | |
|---|---|---|---|
| 4,120,049 | 10/1978 | Thaler et al. | 365/230 |
| 4,122,443 | 10/1978 | Thaler et al. | 340/146.3 |
| 5,040,214 | 8/1991 | Grossberg et al. | 381/43 |
| 5,214,716 | 5/1993 | Refregier et al. | 382/42 |
| 5,239,594 | 8/1993 | Yoda | 382/15 |
| 5,239,619 | 8/1993 | Takatori et al. | 395/23 |
| 5,245,696 | 9/1993 | Stork et al. | 395/13 |
| 5,263,124 | 11/1993 | Weaver et al. | 382/37 |
| 5,271,090 | 12/1993 | Boser | 395/21 |
| 5,333,209 | 7/1994 | Sinden et al. | 382/13 |

OTHER PUBLICATIONS

Bottou et al, "Comparison of classifier methods: A case study in Handwritten digit recognition," Proc. of 12th IAPR Conf., Oct. 9–13, 1994, pp. 77–82.

Schulmeister, B, "The piecewise linear classifier DIPOL92," Machine Learning:ECML–94. pp. 411–414.

R. Courant and D. Hilbert, Methods of Mathematical Physics, Interscience: New York, pp. 122–141, 1953.

D.G. Luenberger, Linear and Non–Linear Programming, Addison–Wesley: Reading, MA, pp. 326–330, 1984.

V.N. Vapnik, Estimation of Dependencies Based on Empirical Data, Springer–Verlag: New York, pp. 355–367, 1982.

M. Aizerman, E. Braverman, and L. Rozonoer, "Theoretical Foundations of The Potential Function Method in Pattern Recognition Learning", Automation and Remote Control, vol. 25, pp. 821–837, Jun. 1964.

B.E. Boser, I. Goyon, and V.N. Vapnik, "A Training Algorithm For Optimal Margin Classifiers", Proceedings Of The 4–th Workshop of Computational Learning Theory, vol. 4, San Mateo, CA, Morgan Kaufman, 1992.

Y. Le Cun, B. Boser, J. Denker, D. Henderson, R. Howard, W. Hubbard, and L. Jackel, "Handwritten Digit Recognition with a Back–Propagation Network", (D. Touretzky, Ed.), Advances In Neural Information Processing Systems, vol. 2, Morgan Kaufman, 1990.

A.N. Refenes et al., "Stock Ranking: Neural Networks Vs. Multiple Linear Regression":, IEEE International Conf. on Neural Networks, vol. 3, San Francisco, CA, IEEE, pp. 1419–1426, 1993.

M. Rebollo et al., "A Mixed Integer Programming Approach to Multi-Spectral Image Classification", Pattern Recognition, vol. 9, No. 1, Jan. 1977, pp. 47–51, 54–55, and 57.

V. Uebele et al., "Extracting Fuzzy Rules From Pattern Classification Neural Networks", Proceedings From 1993 International Conference on Systems, Man and Cybernetics, Le Touquet, France, 17–20, Oct. 1993, vol. 2, pp. 578–583.

C. Cortes et al., "Support–Vector Networks", Machine Learning, vol. 20, No. 3, Sep. 1995, pp. 273–297.

*Primary Examiner*—Robert W. Downs
*Assistant Examiner*—A. Katbab

[57] ABSTRACT

A soft margin classifier and method are disclosed for processing input data of a training set into classes separated by soft margins adjacent optimal hyperplanes. Slack variables are provided, allowing erroneous or difficult data in the training set to be taken into account in determining the optimal hyperplane. Inseparable data in the training set are separated without removal of data obstructing separation by determining the optimal hyperplane having minimal number of erroneous classifications of the obstructing data. The parameters of the optimal hyperplane generated from the training set determine decision functions or separators for classifying empirical data.

31 Claims, 7 Drawing Sheets

SOFT MARGIN CLASSIFIER

BACKGROUND OF THE INVENTION

1. Field of the Invention

This disclosure relates to automated data classifiers. In particular, this disclosure relates to an apparatus and method for performing two-group classification of input data in automated data processing applications.

2. Description of the Related Art

Automated systems for data classifying application such as, for example, pattern identification and optical character recognition, process sets of input data by dividing the input data into more readily processible subsets. Such data processing employs at least two-group classifications; i.e. the classifying of input data into two subsets.

As known in the art, some learning systems such as artificial neural networks (ANN) require training from input training data to allow the trained learning systems to perform on empirical data within a predetermined error tolerance. In one example, as described in Y. Le Cun et al., "Handwritten Digit Recognition with a Back-propagation Network" (D. Touretzky, Ed.), ADVANCES IN NEURAL INFORMATION PROCESSING SYSTEMS, Volume 2, Morgan Kaufman, 1990; a five layer back propagation neural network is applied to handwritten digit recognition on a U.S. Postal Service database of 16×16 pixel bit-mapped digits containing 7300 training patterns and 2000 test patterns recorded from actual mail.

One classification method known in the art is the Optimal Margin Classifier (OMC) procedure, described in B. E. Boser, I. Goyan, and V. N. Vapnik, *A Training Algorithm for Optimal Margin Classifiers*, PROCEEDINGS OF THE FOURTH WORKSHOP OF COMPUTATIONAL LEARNING THEORY, Vol. 4, Morgan Kaufman, San Mateo, Calif. 1992. An application of the OMC method is described in commonly assigned U.S. patent application No. 08/097,785, filed Jul. 27, 1993, and entitled AN OPTIMAL MARGIN MEMORY-BASED DECISION SYSTEM, which is incorporated herein by reference.

Figure 1:
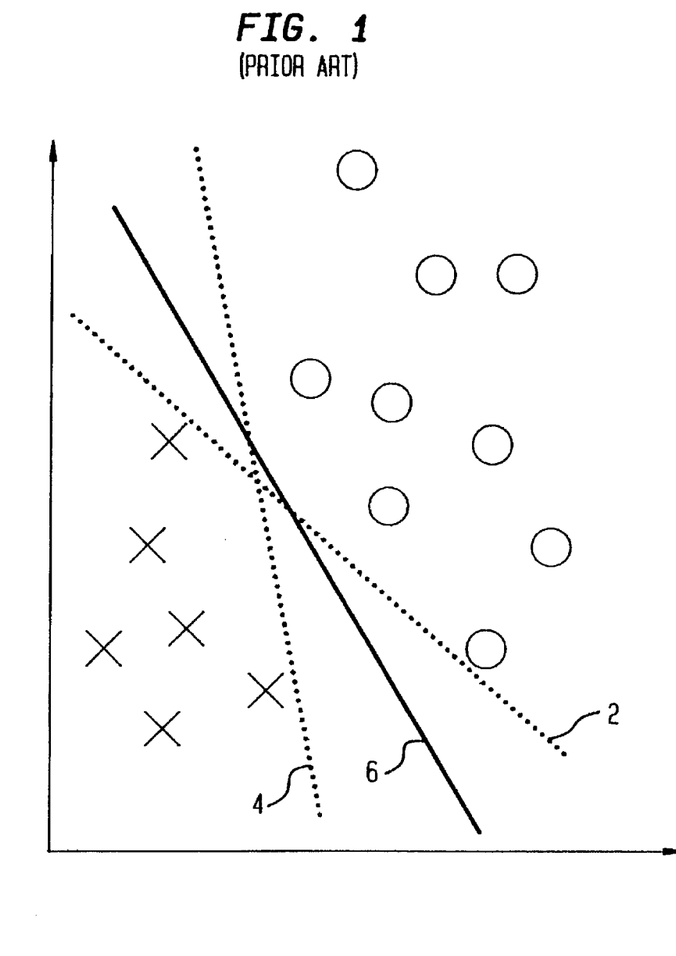
FIG. 1 illustrates an example of two-dimensional classification by the OMC method.

Generally, using a set of vectors in n-dimensional space as input data, the OMC classifies the input data with non-linear decision surfaces, where the input patterns undergo a non-linear transformation to a new space using convolution of dot products for linear separation by optimal hyperplanes in the transformed space, such as shown in FIG. 1 for two-dimensional vectors in classes indicated by X's and O's. In this disclosure the term "hyperplane" means an n-dimensional surface and includes 1-dimensional and 2-dimensional surfaces; i.e. points and lines, respectively, separating classes of data in higher dimensions. In FIG., 1 the classes of data vectors may be separated by a number of hyperplanes 2, 4. The OMC determines an optimal hyperplane 6 separating the classes.

In situations having original training patterns or dot-product-transformed training patterns which are not linearly separable, learning systems trained therefrom may address the inseparability by increasing the number of free parameters, which introduces potential over-fitting of data. Alternatively, inseparability may be addressed by pruning from consideration the training patterns obstructing separability, as described in V. N. Vapnik, ESTIMATION OF DEPENDENCIES BASED ON EMPIRICAL DATA, New York: Springer-Verlag, pp. 355–369, 1982; followed by a restart of the training process on the pruned set of training patterns. The pruning involves a local decision with respect to a decision surface to locate and remove the obstructing data such as erroneous, outlying, or difficult training patterns.

It is preferable to absorb such separation obstructing training patterns within soft margins between classes and to classify training patterns that may not be linearly separable using a global approach in locating such separation obstructing training patterns. It is also advantageous to implement a training method which avoids restarting of detecting difficult training patterns for pruning.

SUMMARY

A soft margin classification system is disclosed for differentiating data vectors to produce a classification signal indicating membership status of each data vector in class. The soft margin classification system includes a processing unit having memory for storing the data vectors in a training set; stored programs including a data vector processing program; and a processor controlled by the stored programs. The processor includes determining means for determining parameters including slack variables from the data vectors, the parameters representing a multidimensional surface differentiating the data vectors with respect to the class; and means for generating the classification signal from the data vectors and the parameters.

The generating means evaluates a decision function of the parameters and each data vector to indicate membership of a respective data vector in the class to generate the classification signal. The determining means determines the parameters including a weight vector and a bias for all of the data vectors in a training set, and determines a minimum non-negative value of the slack variables for each data vector from a plurality of constraints.

The determining means minimizes a cost function to satisfy a plurality of constraints. The determining means determines the weight vector and bias representing an optimal hyperplane separating classes A, B. An input device is provided for inputting the training set of data vectors, and the processor includes means for transforming the data vectors using convolution of dot products.

A method is also disclosed for differentiating pattern vectors to indicate membership in a class comprising the steps of storing data vectors in memory; processing the data vectors using stored programs including a data vector processing program; determining parameters including slack variables from the data vectors, the parameters representing a multidimensional surface differentiating the data vectors with respect to a class; and generating a classification signal from the data vectors and the parameters.

BRIEF DESCRIPTION OF THE DRAWINGS

The features of the disclosed soft margin classifier and method will become more readily apparent and may be better understood by referring to the following detailed description of an illustrative embodiment of the present invention, taken in conjunction with the accompanying drawings, where.

DESCRIPTION OF THE PREFERRED EMBODIMENTS

Figure 2:
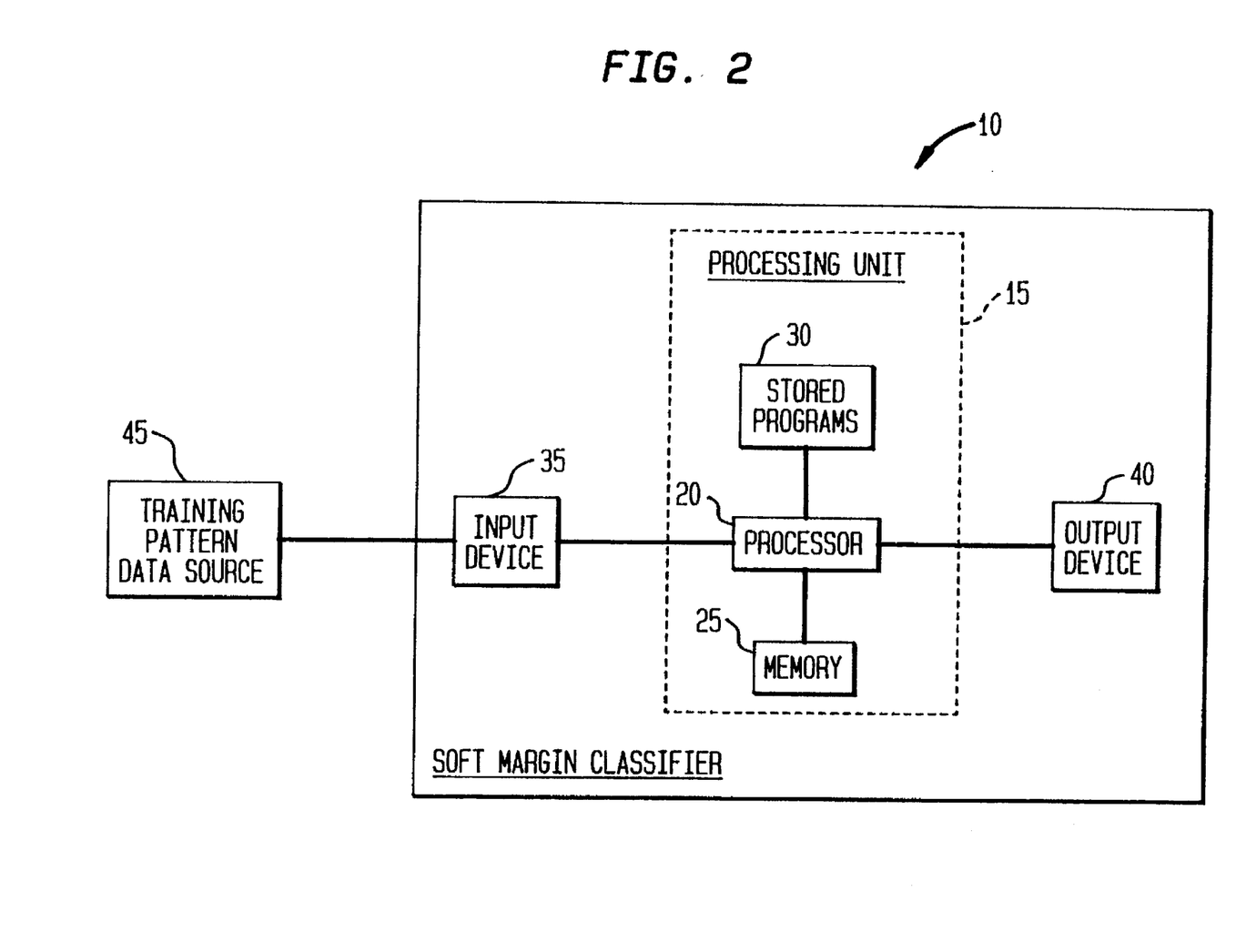
FIG. 2 shows the components of the soft margin classifier disclosed herein.

Referring now in specific detail to the drawings, with like reference numerals identifying similar or identical elements, as shown in FIG. 2, the present disclosure describes an apparatus and method implementing a soft margin classifier 10, which includes a processing unit 15 having a processor 20, memory 25, and stored programs 30 including a matrix reduction program; an input device 35; and an output device 40. In an exemplary embodiment, the processing unit 15 is preferably a SPARC workstation available from Sun Microsystems, Inc. having associated RAM memory and a 400 MB capacity hard or fixed drive as memory 25. The processor 20 operates using the UNIX operating system to run application software as the stored programs 30 providing application programs and subroutines implementing the disclosed soft margin classifier system and methods.

The processor 20 receives commands and training pattern data from a training pattern data source 45 through the input device 35 which includes a keyboard and/or a data reading device such as a disk drive for receiving the training pattern data from storage media such as a floppy disk. The received training pattern data are stored in memory 25 for further processing to determine parameters of an optimal hyperplane as described below.

The parameters are used by the processor 15 as a decision function to classify input empirical data to generate a classification signal corresponding to the input empirical data as being a member or non-member of a specified class corresponding to a separator value input by the user through the input device 35. The classification signal is sent to an output device 40 such as a display for displaying the input data classified by the decision function. Alternatively, the output device 30 may include specialized graphics programs to convert the generated classification signal to a displayed graphic of a multidimensional hyperplane representing the decision function. In additional embodiments, the generated classification signal includes a weight vector, a bias, and slack variables listed in a file with the input training patterns for output as columns or tables of text by the output device 40 which may be a display or a hard copy printer.

The soft margin classifier 10 performs the application programs and subroutines, described hereinbelow in conjunction with FIGS. 3–4, which are implemented from complied sources code in the C programming language with a LISP interface.

The present invention includes a method for generating a classification signal from input training patterns, including the steps of storing data vectors in memory; processing the data vectors using stored programs including a data vector processing program; determining parameters including slack variables from the data vectors, the parameters representing a multidimensional surface differentiating the data vectors with respect to a class; and generating a classification signal from the data vectors and the parameters.

Figure 3:
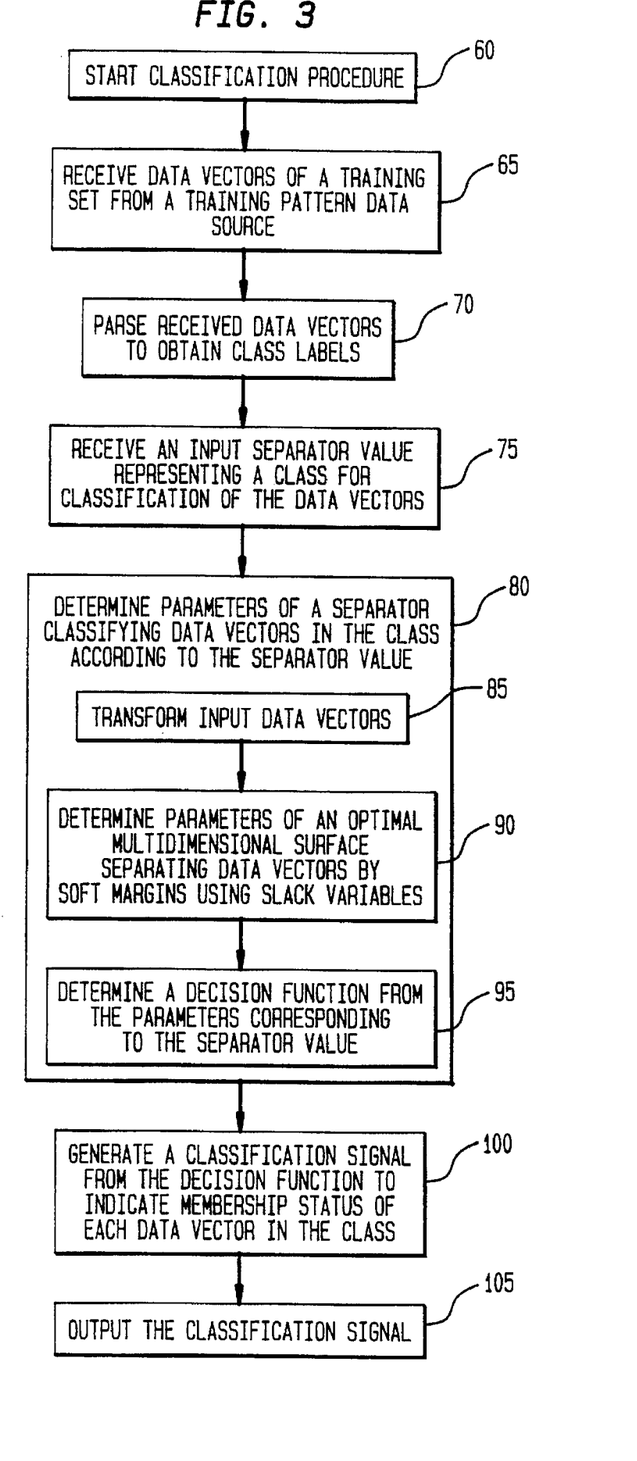
FIG. 3 illustrates a block diagram of the operation of the soft margin classifier.
Figure 4:
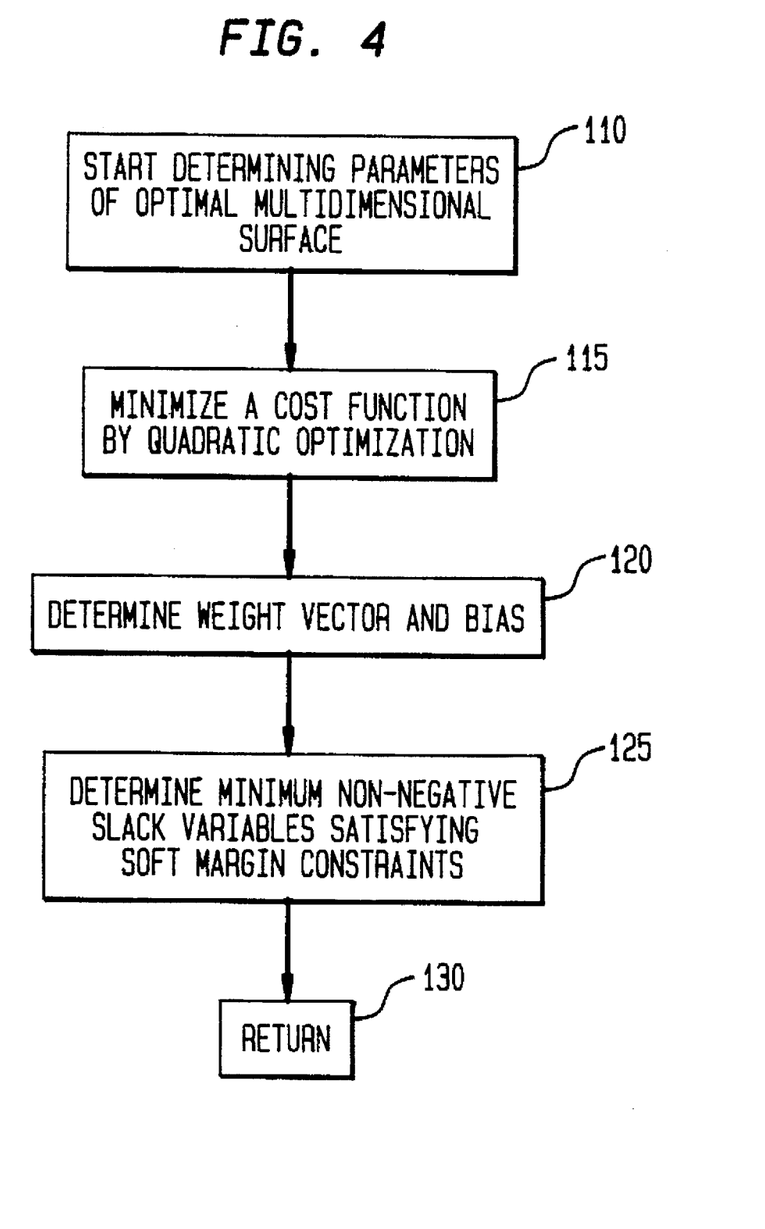
FIG. 4 illustrates a block diagram of a subroutine implementing a parameter determination procedure.

In an exemplary embodiment, as shown in FIGS. 3–4, the soft margin classifier 10 starts a classification procedure in step 60 using the data vector processing program, including the steps of receiving data vectors of the training set from a training pattern data source in step 65; parsing received data vectors to obtain class labels in step 70; receiving an input separator value representing a class which is selected by a user through input device 35 for classification of the data vectors in step 75; and determining parameters of a separator classifying data vectors in the class according to the separator value in step 80 which includes transforming input data vectors in step 85 according to a predetermined vector mapping; determining parameters of an optimal multidimensional surface separating parsed data vectors by soft margins using slack variables in step 90; and determining a decision function from the parameters corresponding to the separator value in step 95.

After determining the parameters in step 80, the classification procedure performs the steps of generating a classification signal from the decision function to indicate membership status of each data vector in the class in step 100; and outputting the classification signal in step 105.

In step 90, the determination of parameters is performed by a subroutine as shown in FIG. 4 including the steps of starting the determination of parameters of the optimal multidimensional surface in step 110; minimizing a cost function by quadratic optimization in step 115; determining weight vector and bias in step 120; determining minimum non-negative slack variables satisfying soft margin constraints in step 125; and returning the determined weight vector, bias, and slack variables in step 130 to proceed to step 95 in FIG. 3.

In an exemplary embodiment, the soft margin classifier 10 generates ten separators for each digit 0, 1, ... 9, where a separator is a classification signal or set of parameters determining a decision function derived from the training set. The decision function derived from the training set is used to classify empirical input data with respect to the selected class.

In the exemplary embodiment for use in recognizing bit mapped digits, each pattern $t_i$ of data in the training set T includes a bit map $s_i$ and a label $y_i$ of a digit D where the pattern $s_i$, when reformatted, determines the shape and appearance of the digit D. Data pattern $t_i$ is referred to as a vector, but $t_i$ may be in other equivalent or comparable configurations; for example, matrices, data blocks, coordinates, etc.

Each data pattern $t_i$ is associated with the set $Y_D$ by its corresponding label $y_i$, where $Y_D$ is the set of all patterns which are bit maps of digit D. Data pattern $t_i$ may thus be represented by the vector $(s_i, y_i)$ indicating that pattern $s_i$ has label $y_i$; $s_i \in Y_D$ (belongs to set $Y_D$); and $s_i$ represents a bit map of digit D. Also associated with $Y_D$ is its complement $Y_D'$=not($Y_D$) where $Y_d'$ is the set of all patterns $t_i$ having corresponding bit map data $s_i$ which do not represent a bit map of digit D. Thus, $Y_D \cup Y_D'$=T.

Figure 5:
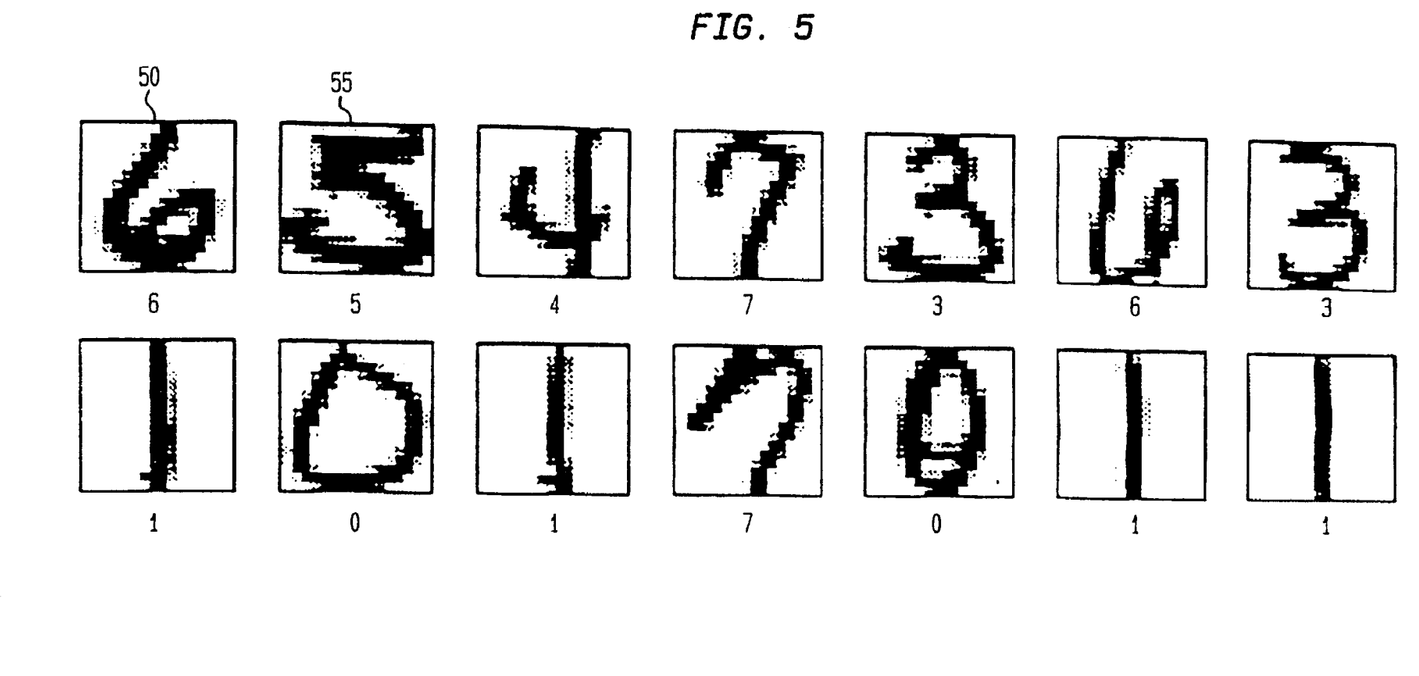
FIG. 5 illustrates exemplary bit map digits as training patterns.

As shown in FIG. 5, fourteen patterns are bit maps of digits with their corresponding label of the represented digit respectively below. Therefore, a data pattern $s_1$ shown as reference 50 in FIG. 5 is a bit map of digit 6, so $s_1$ is associated with $Y_6$ and $s \in Y_6$. Similarly, data pattern $s_2$ shown as reference 55 in FIG. 5 is a bit map of digit 5, so $s_2 \in Y_5$, $s_2 \notin Y_6$, and $s_1 \notin Y_5$.

In the above examples, $s_1$, $s_2 \in T$ are bit maps of 16×16 pixels so the length of each data pattern $s_1$, $s_2$ is 16×16=256 bits and so each is represented in the above example by a 256 component vector.

In operation the soft margin classifier 10 parses each pattern $t_i$=($s_i$, $y_i$) of label $Y_i$, leaving data vector $s_i$, and then each vector $s_i$ is transformed by convolution of a dot product to transformed data vectors $x_i$. The transformation permits classification using non-linear decision surfaces; i.e. a non-linear transformation is performed on the input patterns in the input space to a new transformed space permitting linear separation by optimal hyperplanes of the OMC method in the references cited above.

A predetermined k-dimensional vector function $$V: R^n \to R^k \quad (1)$$

maps each n-dimensional training vector $s_i$ to a new k-dimensional training vector $x_i = V(s_i)$. As described below, a k-dimensional weight vector w and a bias b is then constructed for each digit D such that a decision function classification function $f_A$ for class A is a linear separator of the transformed training vectors $x_i$ where $$f_A(x) = w \cdot V(x) + b \quad (2)$$

In the exemplary example, $A=Y_D$ and $B=Y_D'$ for generating a decision function or separator classifying input data vectors to determine the membership status of the input data vectors in each class A, B; i.e. to determine whether or not each input data vector represents digit D.

In constructing the separator using optimal hyperplanes as in the OMC method, the weight vector may be written as:

$$w = \sum_{i \in A} \alpha_i V(x_i) - \sum_{i \in B} \beta_i V(x_i) \quad (3)$$

where $x_i$ is the transformed training data vectors.

The linearity of the dot product implies that the decision function $f_A$ for class A for unknown empirical data depends on the dot product according to $$\begin{aligned} f(x) &= V(x) \cdot w + b \\ &= \sum_{i \in A} \alpha_i V(x) \cdot V(x_i) - \sum_{i \in B} \beta_i V(x) \cdot V(x_i) + b \end{aligned} \quad (4)$$

The classification method may be generalized by considering different forms of the dot product $$V(u) \cdot V(v) \equiv K(u,v) \quad (5)$$

According to the Hilbert-Schmidt Theorem, as described in R. Courant and D. Hilbert, METHODS OF MATHEMATICAL PHYSICS, Interscience, New York, pp. 122-141, 1953; any symmetric function K(u,v) can be expanded in the form $$K(u,v) = \sum_{i=1}^{\infty} \lambda_i V_i(u) V_i(v) \quad (6)$$

where $\lambda_i \in R$ and $V_i$ are eigenvalues and eigenfunctions, respectively, of the integral equation $$\int K(u,v) V_i(u) du = \lambda_i V_i(v) \quad (7)$$

A sufficient condition to ensure a positive norm of the transformed vectors is that all the eigenvalues in the expansion of Eq. (6) above are positive. To guarantee that these coefficients are positive, it is necessary and sufficient (according to Mercer's Theorem) that the condition $$\int \int K(u,v) g(u) g(v) du\, dv > 0 \quad (8)$$

is satisfied for all g such that $$\int g^2(u) du < \infty \quad (9)$$

Functions that satisfy Mercer's Theorem can therefore be used as dot products. As described in M. Aizerman et al., "Theoretical foundations of the potential function method in pattern recognition learning", Automation and Remote Control, 25:821–837, June 1964; potential functions are of the form $$K(u,v) = \exp\left(-\frac{\|u-v\|}{\sigma}\right) \quad (10)$$

In the Boser et al. publication, cited above, the optimal hyperplane method was combined with the method of convolution of the dot product, and in addition to the potential functions as in Eq. (10) above, polynomial classifiers of the form $$K(u,v) = (u \cdot v + 1)^d \quad (11)$$

were considered.

Using different dot products K(u,v), one can construct different learning machines with arbitrarily shaped decision surfaces. All these learning machines follow the same solution scheme as the original optimal hyperplane method and have the same advantage of effective stopping criteria. A polynomial of the form as in Eq. (11) is used in the soft margin classifier 10 described herein. In use, it was found that the raw error in classification c the U.S. Postal Service Database was between 4.3–4.7% for d=2 to 4, and the error decreased as d increased. With d=4, the raw error was 4.3%.

By increasing the degree d, simple non-linear transformations as in Eq. (11) eventually lead to separation, but the dimensionality of the separating space may become larger than the number of training patterns. Better generalization ability of the learning machine, and less potential overfitting of the data, can be achieved if the method allows for errors on the training set as implemented in the soft margin classifier 10 and method described herein.

The OMC method described above uses margins on either side of an intermediate hyperplane separating the transformed vectors to thus classify the transformed vectors as being on one side or the other of the intermediate hyperplane. The margins are determined by the +1 and −1 in the equation $$f_A(x_i) = \begin{cases} w \cdot x_i + b \geq 1 & \text{if } x_i \in A \\ w \cdot x_i + b \leq -1 & \text{if } x_i \in B \end{cases} \quad (12)$$

In the soft margin classifier 10, the margin is "soft"; i.e. the hyperplane separating the classified data vectors in the transformed space depends on the values of slack variables. The margins are determined from the slack variables such that $$f_A(x_i) = \begin{cases} w \cdot x_i + b \geq 1 - \xi_i(w,b) & \text{if } x_i \in A \\ w \cdot x_i + b \leq -1 + \xi_i(w,b) & \text{if } x_i \in B \end{cases} \quad (13)$$

where $\xi_i(w,b)$ for each pattern is a non-negative slack variable. The value of $\xi_i(w,b)$ is a function of the parameters (w,b) of the decision surface which is the smallest non-negative number that makes the transformed data patterns $x_i$ satisfy the inequality in Eq. (13).

Figure 6:
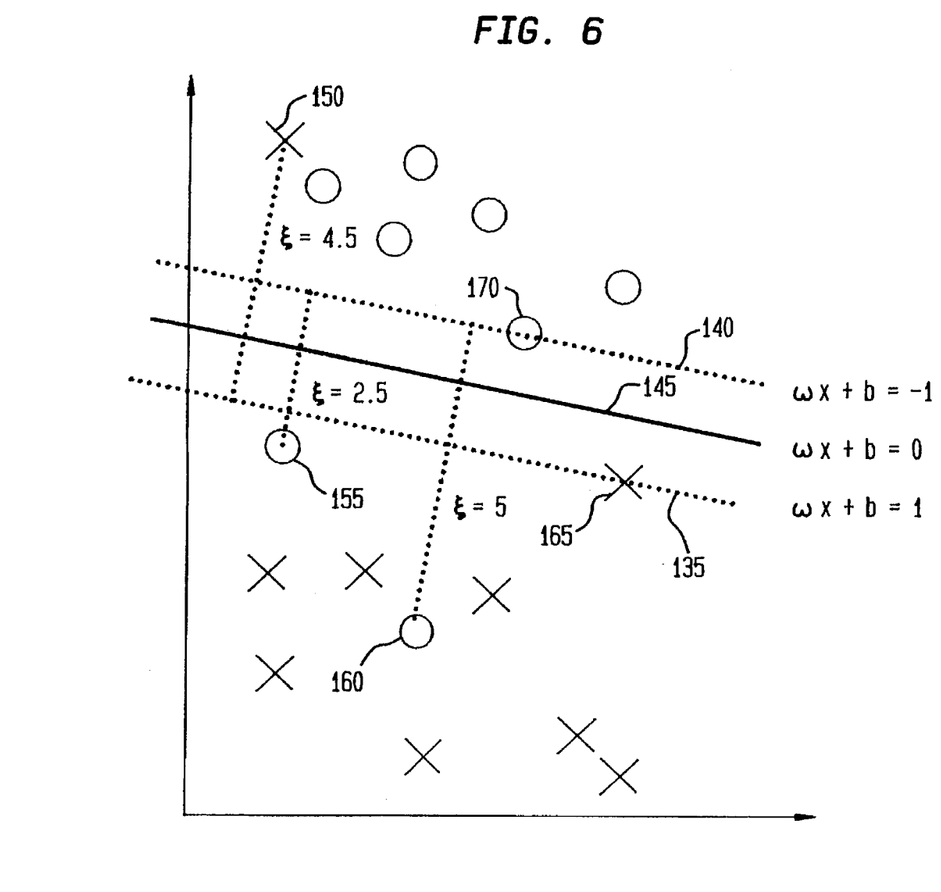
FIG. 6 shows an example of soft margin classification of pattern vectors.

FIG. 6 illustrates the use of slack variables in relation to an optimal hyperplane between vectors of classes A, B represented by X's and O's respectively.

Hyperplanes 135, 140 correspond to w·x +b =−1 and w·x +b =1, respectively, with soft margins extending from each hyperplane 135, 140. Hyperplane 145 corresponds to w·x +b =0 and is intermediate of hyperplanes 135, 140.

As shown in FIG. 6, data vector 150 is in class A but is classified by the soft margin classifier 10 as a member of class B since data vector 150 is present in the region determined by the hyperplanes 135, 140, classifying data vectors as members of class B. Similarly, data vectors 155, 160 from class B are classified as being as class A by the soft margin classifier 10 using hyperplanes 135, 140. As shown in FIG. 6, the values of the slack variables ξ are greater than 1 for data vectors 150, 155, 160; i.e. data vectors 150, 155, 160 are deemed erroneous data. These erroneous data vectors are taken into account by the soft margin classifier 10, as described below, without removal c these data vectors from the training set and without restart of the classification method, in determining the optimal hyperplanes. FIG. 6 also illustrates data vectors 165, 170 of classes A and B, respectively, having ξ=0; i.e. lying on hyperplanes 135, 140, respectively.

The soft margin classifier 10 determines the weight vector w and the bias b having the fewest numbers of errors on the two sets A, B of patterns. A value of $\xi_i(w,b) > 1$ corresponds to an error on pattern $x_i$ since the pattern is classified according to the sign of $w \cdot x_i + b$.

The optimal solution is found to be $(w^*, b^*)$ which minimizes the expression $$E(w,b) = \sum_{i \in A,B} \Theta(\xi_i(w,b) - 1) \tag{14}$$

Figure 7:
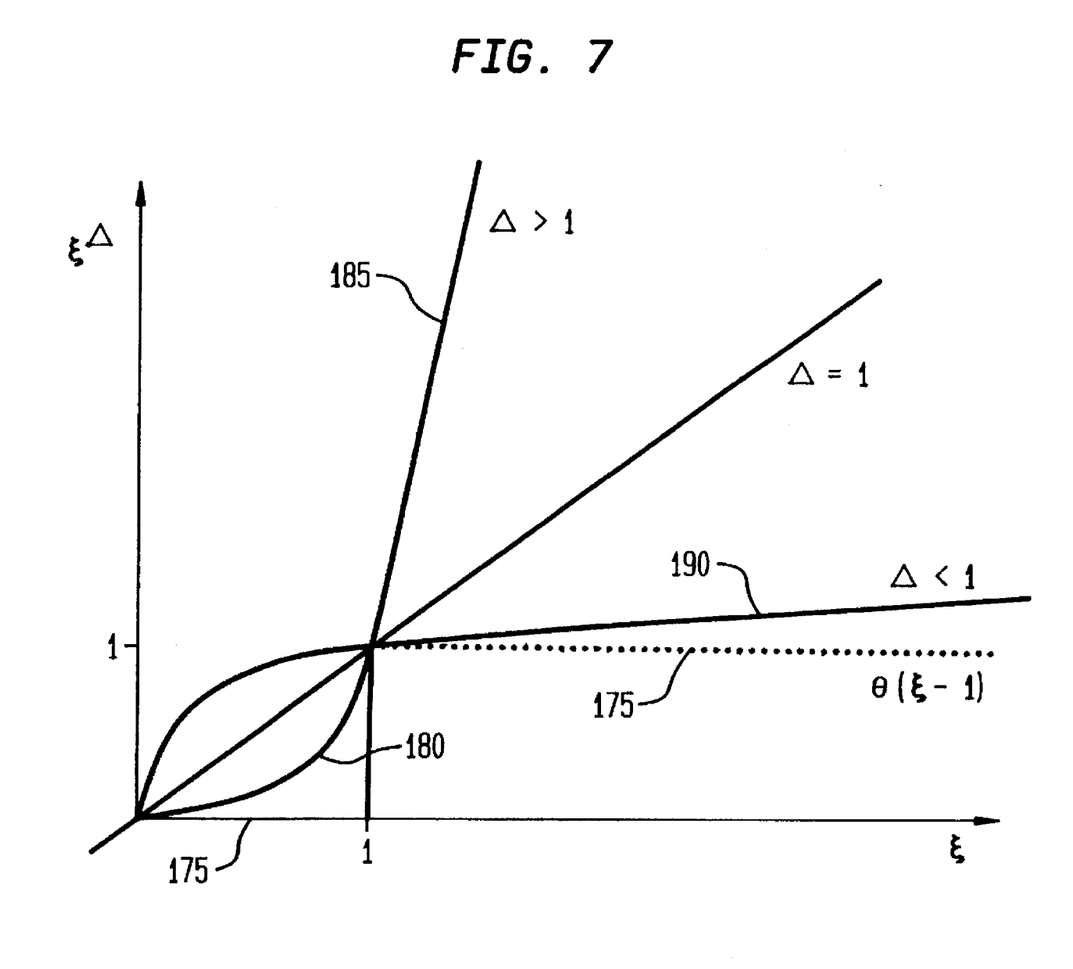
FIG. 7 illustrates error contributions from the slack variables.

As illustrated in FIG. 7, Θ is the step-function: Θ(x)=1 if x>0 and zero otherwise, shown as reference 175.

The minimizing of Eq. (14) is a highly non-linear problem. An analytic expression for an upper bound on the number of errors is obtained through the constraint $$E(w,b) = \sum_{i \in A,B} \Theta(\xi_i - 1) \leq \sum_{i \in A,B} \xi_i^\Delta = \epsilon(w,b) \tag{15}$$

where Δ>0.

As shown in FIG. 7, for Δ>1, the cost of an error increases more than linearly as shown by the graph 180 of $\xi^\Delta$ with the pattern's deviation from the desired value. As seen in FIG. 7, non-errors; i.e. patterns having 0 <ξ<1, make small contributions by $\xi^\Delta$, shown as reference 185, to the sum ϵ(w,b), approximating the zeroing out the non-errors by the step function. As Δ→0 all ξ>1 contribute with the same cost of 1 using the step function where $\xi^\Delta$ is approximately 1, shown as reference 190, as Δ→0, which is preferable to the contribution of each ξ when Δ≧1.

A constraint of the form in Eq. (15) departs from the quadratic programming problem of determining the optimal hyperplane in the OMC, and departs from guaranteed convergence time, unless Δ=1 or 2. In the preferred embodiment of the soft margin classifier 10, Δ=1 is the best mode since it provides a constraint that is near to the desired constraint. In alternative embodiments, a hybrid method is implemented by the soft margin classifier 10 with Δ=2 for 0≦ξ≦1 and Δ=1 for ξ≧1 which provides a moderate increase in computational complexity.

A unique solution to the quadratic optimization problem is provided by the following cost function $$C(w,b,\xi,\epsilon,\eta,\gamma) = \min_{w,b,\xi,z} \left( \frac{1}{2} \|w\|^2 + \eta \frac{1}{2} \epsilon^2 + \gamma \frac{1}{2} \xi^2 \right) \tag{16}$$

where η, γ are parameters of the cost function, kept fixed under optimization. The cost function is minimized in step 115 in FIG. 4 with respect to the following constraints:

$$\begin{aligned} w \cdot x_i + b &\geq 1 - \xi_i \text{ if } x_i \in A \\ w \cdot x_i + b &\leq -1 + \xi_i \text{ if } x_i \in B \\ \xi_i &\geq 0 \end{aligned} \tag{17}$$

$$\sum_{i \in A,B} \xi_i \leq \epsilon$$

The terms in the cost function serve different purposes. The term $\epsilon^2$ enforces a small number of errors. When several solutions exist with the same value of $\epsilon^2$ we choose the unique one that also minimizes $\|w\|^2 + \gamma \xi^2$. The $\|w\|^2$ term is common with the OMC, and it tends to keep the distance between the convex hulls of the correctly classified patterns as far apart as possible. The $\xi^2$ term is chosen to obtain a unique solution, so its multiplier γ is kept at a small positive value.

Eq. (16) can be solved in the dual space of the Lagrange multipliers in a similar manner as in the OMC for determining optimal hyperplanes. Additional m+1 non-negative Lagrange multipliers are introduced: m multipliers, $\epsilon_i$ enforces the constraints $\xi_i \geq 0$, and a multiplier δ enforces the last constraint of Eq. (17).

In the OMC, a function W was defined by the following equation:

$$\alpha^*, \beta^* = \arg \max_{\alpha_i, \beta_i} W$$

$$W = \sum_{i \in A} \alpha_i + \sum_{i \in B} \beta_i - \frac{1}{2} \|w\|^2 \tag{18}$$

where $$w = \sum_{i \in A} \alpha_i x_i - \sum_{i \in B} \beta_i x_i \tag{19}$$

and $$\sum_{i \in A} \alpha_i = \sum_{i \in B} \beta_i \tag{20}$$

In the soft margin classifier system and method disclosed herein, the function W in Eq. (18) is altered to become:

$$W = \sum_{i \in A} \alpha_i + \sum_{i \in B} \beta_i - \frac{1}{2} \psi A \psi \tag{21}$$

with respect to which the 2m+1 non-negative multipliers are maximized, where ψ is the 2m+1 dimensional vector $$\psi = \begin{pmatrix} \alpha, \beta \\ \epsilon \\ \delta \end{pmatrix} \tag{22}$$

and A is a positive definite (2m+1) ×(2m+1) matrix.

The optimal weight vector $w^*$ and bias $b^*$ are determined in step 120 in FIG. 4 by:

$$(w^*, b^*) = \arg \min_{w,b,\epsilon} \left( \frac{1}{2} \|w^2\| + \eta \frac{1}{2} \epsilon^2 + \gamma \frac{1}{2} \xi^2 \right) \tag{23}$$

under the constraints $$\begin{aligned} w \cdot x_i + b &\geq 1 - \xi_i \text{ if } x_i \in A \\ w \cdot x_i + b &\leq -1 + \xi_i \text{ if } x_i \in B \\ \xi_i &\geq 0 \end{aligned} \tag{24}$$

$$\sum_{i \in A,B} \xi_i \leq \epsilon$$

The vectors $U, 1, u_i, V_i, e_i$ of dimension n+m+1 are defined as follows:

$$U = \begin{pmatrix} w \\ \xi \\ \epsilon \end{pmatrix} \; l = \begin{pmatrix} 0 \\ 1 \\ -1 \end{pmatrix} \; u_i = \begin{pmatrix} x_i \\ 0 \\ \vdots \\ 0 \\ 1 \\ 0 \\ \vdots \\ 0 \\ 0 \end{pmatrix} \; i \in A \quad (25)$$

$$v_i = \begin{pmatrix} x_i \\ 0 \\ \vdots \\ 0 \\ -1 \\ 0 \\ \vdots \\ 0 \\ 0 \end{pmatrix} \; i \in B \quad e_i = \begin{pmatrix} 0 \\ 0 \\ \vdots \\ 0 \\ -1 \\ 0 \\ \vdots \\ 0 \\ 0 \end{pmatrix} \; i \in A,B \quad (26)$$

and non-negative Lagrange multipliers $\alpha_i$, $\beta_i$, $\epsilon_i$, and $\delta$ are applied for the constraints. The Lagrange function corresponding to the optimization problem is, with this notation, $$L = \frac{1}{2} UQU - \sum_{i \in A} \alpha_i(u_iU - 1) + \sum_{i \in B} \beta_i(v_iU + 1) - \sum_{i \in A,B} \epsilon_i e_i U + \delta l U \quad (27)$$

where Q is a n+m+1×n+m+1 diagonal matrix $$Q = \begin{pmatrix} I & 0 & 0 \\ 0 & \gamma I & 0 \\ 0 & 0 & \eta \end{pmatrix} \quad (28)$$

The minimization of Eq. (27) with respect to U is performed according to the following Kuhn-Tucker conditions:

$$w^* = \sum_{i \in A} \alpha_i x_i - \sum_{i \in B} \beta_i x_i \quad (29)$$

$$\sum_{i \in A} \alpha_i = \sum_{i \in B} \beta_i$$

$$\xi_i^* = \frac{\alpha_i + \epsilon_i - \delta}{\gamma} \quad \text{if } y_i = 1$$

$$\eta_i^* = \frac{\beta_i + \epsilon_i - \delta}{\gamma} \quad \text{if } y_i = -1$$

$$\epsilon^* = \frac{\delta}{\eta}$$

$\alpha_i, \beta_i, \epsilon_i, \delta \geq 0 \qquad i = 0,1,\ldots,m$ $(w \cdot x_i + b - + \xi_i)\alpha_i = 0 \qquad \text{for } x_i \in A$ $(w \cdot x_i + b + 1 - \xi_i)\beta_i = 0 \qquad \text{for } x_i \in B$ $\epsilon_i \xi_i = 0 \qquad i = 0,1,\ldots,m$ $\left(\epsilon - \sum_{i \in A,B} \xi_i\right)\delta = 0$ Back-substitution the first five expressions of Eq. (29) back into Eq. (27) determines a maximization problem in the 2m+1 dimensional multiplier space of $\alpha_i$, $\beta_i$, $\epsilon_i$, $\delta$:

$$\alpha_i^*, \beta_i^*, \epsilon_i^*, \delta = \arg \max_{\alpha_i, \beta_i, \epsilon_i, \delta} W \quad (30)$$

$$W = \sum_{i \in A} \alpha_i + \sum_{i \in B} \beta_i - \frac{1}{2} UQU$$

From the above, W is a quadratic form of the multipliers due to the introduction of the n+m+1 dimensional vector $\psi$ defined in Eq. (22). One obtains $$W = c\psi - \frac{1}{2} \psi A \psi \quad (31)$$

with $$c = \begin{pmatrix} 1 \\ 0 \\ 0 \end{pmatrix} \quad (32)$$

$$G = \begin{pmatrix} hI + H & hI & -h \\ hI & hI & -h \\ -h & -h & m^*h + k \end{pmatrix} \quad (33)$$

and $$h = \frac{1}{\gamma} \quad k = \frac{1}{\eta} \quad (34)$$

where the matrix H in the n+m+1 dimensional block matrix A is the signed dot products between vectors:

$$h_{ij} = Y_i Y_j X_i X_j$$

and m* is the number of patterns with non-zero $\xi$ in the solution.

The constnaint:

$$\sum_{i \in A,B} \xi_i \leq \epsilon \quad (35)$$

is to be valid when the sum is taken over all non-zero $\xi$. It also has to be fulfilled for any subset of the $\xi$ as well. Lagrange multipliers, $\xi_1, \xi_2, \ldots \xi_p$, corresponding to every subset of patterns considered to form the intermediate solutions. The dimension of the Lagrange multiplier space is now n+m+p, and the Kuhn-Tucker conditions read:

$$w = \sum_{i \in A} \alpha_i x_i - \sum_{i \in B} \beta_i x_i \quad (36)$$

$$\xi_i = h \left( \alpha_i + \epsilon_i - \sum_{\text{subsets } j} \delta_j \right)$$

$$\epsilon = k \sum_{j=1}^{p} \delta_j$$

and the G matrix last column and row are widened to a band of width p. For every subset, j, to which $\xi_i$ is a member, there will be an entry k as defined above in position (i, n+m+j), (i+m, n+m+j), (n+m+j, i) and (n+m+j, i+m). The bottom right p×p block is of the form $$A_{pp} = \begin{pmatrix} m_1^* & m_1^* & \ldots & m_1^* \\ m_1^* & m_1^* + m_2^* & \ldots & m_1^* + m_2^* \\ \vdots & \vdots & & \vdots \\ \vdots & \vdots & & \vdots \\ m_1^* & m_1^* + m_2^* & \ldots & \sum_p m_j^* \end{pmatrix} \quad (37)$$

where $m_1^* + m_2^*$ are the $\xi$ vectors in both subset 1 and 2. The off-diagonal matrix of the above matrix may be ignored to do the optimization with respect to the individually $\delta$'s independently, and also to reduce the number of support patters in the intermediate solutions. Thus, the obtained solution provides an accurate approximation for $(w^*, b^*)$ to a true optimum.

Upon determining $(w^*, b^*)$ in step 120 in FIG. 4 and minimizing the slack variables $\xi$ in step 125 in FIG. 4, the classification signal is then generated with respect to class A from the sign of the value of the decision function $f_A(x_c)$, where $x_c$ is empirical data transformed by a dot product mapping function and input to the determined decision function. Referring to Eq. (13) in conjunction with FIG. 6, for non-erroneous patterns, the slack variables $\xi$ satisfy the inequality $0 < \xi \leq 1$ and also satisfy Eq. (13), so the sign of $f_A(x)$ is +1 if $x \in A$ and the sign of $f_A(x)$ is −1 if $x \notin A$. Thus, $f_A(x_c)$ uniquely determines the classification of empirical data patterns $x_c$ and provides a predicted classification of the empirical data patterns based on the training set $x_i$ and optimally determined with soft margins about an optimal hyperplane between classes.

The above described exemplary embodiments apply the soft margin classifier 10 and method of use described above to two-group classification of data patterns representing pixels of 16×16 pixel bit map digits, where A and B are complementary classes or sets of patterns such that A=set of all patterns representing digit D, and B=set of all patterns not representing digit D. However, it is contemplated that pattern recognition applications such as classification of alphabetical and symbol bit map, voice data, financial data, etc. may be classified according to the above described system and method.

It is further contemplated that classes, A and B may overlap (i.e. are non-complementary) in implementing classification in the above recited pattern recognition applications, and that the training patterns may include more than one label. For example, multiple labels may indicate specific digits, curved or straight portions of the displayed bit map digits, and membership in arbitrary classes e.g. even and odd numbers. The training patterns may then be parsed to perform classification with respect to a specific label.

While the disclosed soft margin classifier and method has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A system for differentiating data vectors to produce a signal indicating membership status of each data vector in a class, the system comprising:

a processing unit including memory for storing the data vectors; stored programs including a data vector processing program; and a processor controlled by the stored programs and including:

means for determining parameters including slack variables from the data vectors, the parameters representing a multidimensional surface differentiating the data vectors with respect to the class; and means for generating the signal from the data vectors, the parameters and the slack variables.

2. The system of claim 1 wherein the generating means evaluates a decision function of the parameters and each data vector to indicate membership of a respective data vector in the class to generate the signal.

3. The system of claim 2 wherein the generating means generates the signal from a sign function of a value of the evaluated decision function.

4. The system of claim 3 wherein the determining means determines the parameters including a weight vector and a bias from a plurality of constraints.

5. The system of claim 4 wherein the generating means evaluates the decision function from a linear sum of the bias and a dot product of the weight vector and a respective data vector.

6. The system of claim 4 wherein the determining means determines a minimum non-negative value of the slack variables for each data vector from the weight vector and the bias satisfying the plurality of constraints.

7. A classifier for classifying data vectors to produce a signal representing membership status of each data vector with respect to a plurality of classes, the classifier comprising:

means for providing the data vectors to be classified;

memory for receiving and storing the data vectors and stored programs including a data vector processing program; and a processor controlled by the data vector processing program and including:

means for determining parameters including slack variables from the data vectors, the parameters representing a multidimensional surface separating the data vectors into the plurality of classes;

means for minimizing the slack variables; and means for generating the signal from the data vectors, the parameters and the minimized slack variables.

8. The classifier of claim 7 wherein the determining means determines the parameters including a plurality of multipliers to satisfy a plurality of constraints.

9. The classifier of claim 7 wherein the determining means determines the parameters to represent an optimal multidimensional surface.

10. The classifier of claim 8 wherein the determining means minimizes a cost function of the slack variables to determine the optimal multidimensional surface.

11. The classifier of claim 7 further comprises:

means for inputting a class separator value;

the processor further includes means for parsing the data vectors to extract class labels therefrom;

the determining means determines the parameters as a decision function corresponding to the class separator value; and the generating means generates the signal indicating data vectors with corresponding class labels are members of the class corresponding to the class separator value.

12. The classifier of claim 11 wherein the determining means transforms the data vectors using a predetermined vector mapping, and determines the parameters from the transformed data vectors.

13. The classifier of claim 7 wherein the classifier classifies a training set of pattern vectors as the data vectors and the generating means generates the signal to indicate the membership of each pattern vector in the training set with respect to the class.

14. A soft margin classifier for classifying vector patterns $x_i$ associated with a training set of data vectors into at least two classes A, B, the soft margin classifier comprising a source providing the data vectors and a processing unit including:

memory having stored programs including data vector processing program for receiving the vector patterns in the training set from the source; and a processor controlled by the stored program including:
means for determining a weight vector w, a bias b, and a slack variable $\xi_i$ simultaneously satisfying soft margin conditions:

$$f(x_i) = w \cdot x_i + b = \begin{cases} \geq 1 - \xi_i & \text{if } x_i \in A \\ \leq -1 + \xi_i & \text{if } x_i \in B \end{cases} ;$$

and means for generating and outputting a signal from the respective signs of $f(x_i)$ for each $x_i$.

15. The soft margin classifier of claim 14 wherein the determining means determines a minimum non-negative value of $\xi_i$ for each $x_i$.

16. The soft margin classifier of claim 14 wherein the determining means determines w and b to minimize a cost function of w, b, and each $\xi_i$.

17. The soft margin classifier of claim 14 wherein the determining means minimizes the cost function to satisfy a plurality of constraints.

18. The soft margin classifier of claim 14 wherein the determining means determines the weight vector w and bias b representing an optimal hyperplane separating classes A, B.

19. The soft margin classifier of claim 14 further comprising:
an input device for inputting the training set $t_i$ of data vectors; and
the processor includes means for transforming the data vectors $t_i$ to the vector patterns $x_i$.

20. A method for differentiating pattern vectors to indicate membership in a class comprising the steps of:
storing data vectors in memory;
processing the data vectors using stored programs including a data vector processing program;
determining parameters including slack variables from the data vectors, the parameters representing a multi-dimensional surface differentiating the data vectors with respect to a class; and generating the signal from the data vectors, the parameters and the slack variables.

21. The method of claim 20 wherein the step of generating includes evaluating a decision function of the parameters and each data vector.

22. The method of claim 21 wherein the step of generating includes evaluating a sign function of a value of the evaluated decision function.

23. The method of claim 20 wherein the step of determining includes determining a weight vector and a bias from a plurality of constraints.

24. The method of claim 23 wherein the step of determining includes evaluating a linear sum of the bias and a dot product of the weight vector and a respective data vector.

25. The method of claim 23 wherein the step of determining includes minimizing a non-negative value of the slack variables for each data vector from the weight vector and the bias satisfying a plurality of constraints.

26. A method for classifying pattern vectors comprising the steps of:
providing the data vectors to be classified from a data source;
receiving and storing the data vectors in memory;
determining parameters, including a weight vector, a bias, and slack variables, from the data vectors, the parameters representing a multidimensional surface separating the data vectors into a plurality of classes;
minimizing the slack variables; and
generating the signal from the data vectors, the parameters and the minimized slack variables.

27. The method of claim 26 wherein the step of determining includes determining the parameters to represent an optimal multidimensional surface.

28. The method of claim 27 wherein the step of determines the parameters includes determining the plurality of slack variables minimizing a cost function of the slack variables to determine the optimal multidimensional surface.

29. The method of claim 26 wherein the step of determining includes determining the parameters including a plurality of multipliers to satisfy a plurality of constraints.

30. The method of claim 26 further comprising the steps of:
parsing the received data vectors to extract corresponding class labels;
inputting a class separator value; and
the step of generating includes generating the signal indicating data vectors with corresponding class labels are members of the class corresponding to the class separator value.

31. The method of claim 26 further comprising the steps of:
transforming the received data vectors using a predetermined vector mapping; and
the step of determining includes determining the parameters from the transformed data vectors.

\* \* \* \* \*